June 14, 1938.   B. A. LEWIS   2,120,367
PROSTATIC AND VAGINAL MEDICINE APPLICATOR
Filed June 30, 1936

Inventor
Burnard A. Lewis
by Hazard and Miller
Attorneys

Patented June 14, 1938

2,120,367

UNITED STATES PATENT OFFICE 2,120,367

PROSTATIC AND VAGINAL MEDICINE APPLICATOR

Burnard A. Lewis, Los Angeles, Calif.

Application June 30, 1936, Serial No. 88,156

1 Claim. (Cl. 128—261)

My invention is a medicine applicator in which a medicament, preferably incorporated with a jelly-like material, is inserted by a tubular probe and then expelled at the place of application. The manner of use is well known in the medical art.

In my invention I utilize a tubular probe with a removable cap having an orifice, the cap being designed to contain the medicament incorporated with jelly or the like, this being expelled by means of a plunger which operates through the tubular probe.

My invention is illustrated in connection with the accompanying drawing, in which.

Figure 1:
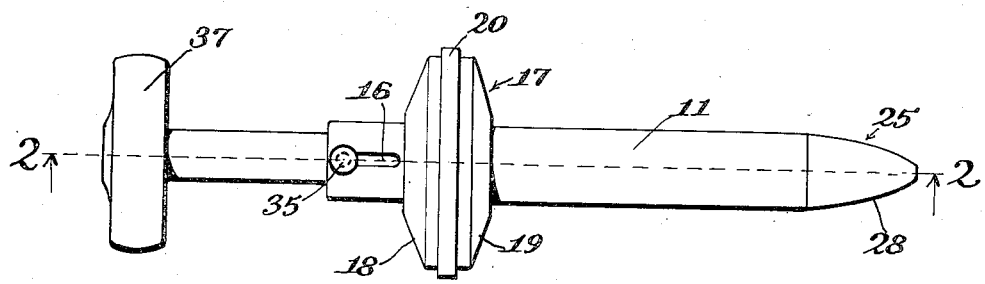
Fig. 1 is a side elevation of my invention.
Figure 2:
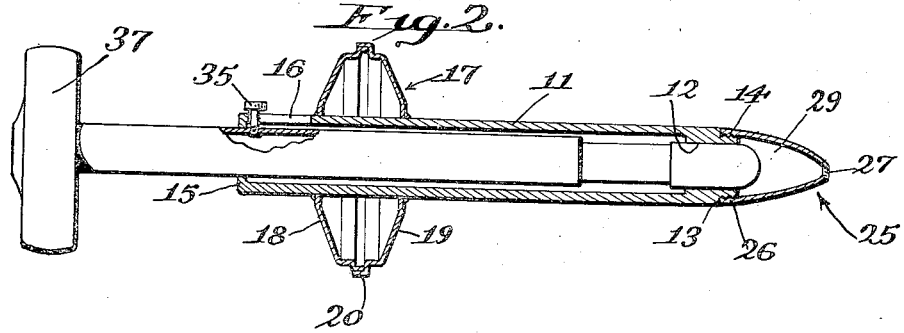
Fig. 2 is a longitudinal section on the line 2—2 of Fig. 1 in the direction of the arrows.
Figure 3:
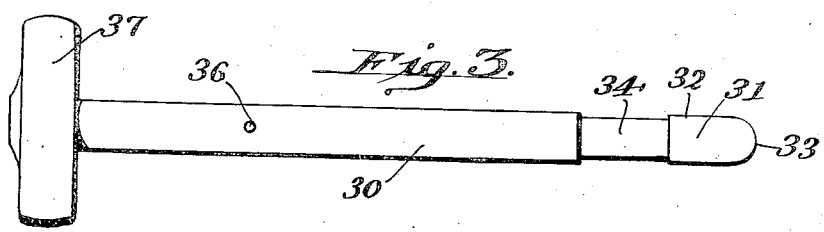
Fig. 3 is a plan of the plunger removed from the tubular probe.
Figure 4:
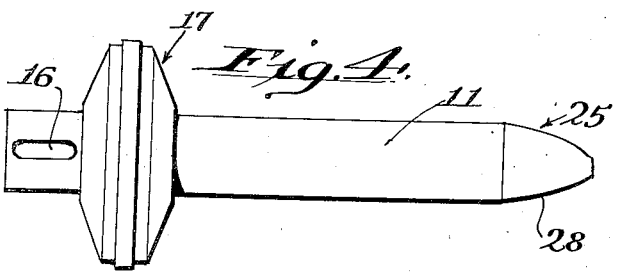
Fig. 4 is a plan of the probe with the cap.

In my invention I utilize a tubular probe 11 which has a contracted cylindrical guide internal surface 12 at one end, this end having a shoulder 13 and beyond the shoulder there are external threads 14. The opposite end of the probe has an inturned rim 15. It is also provided with a longitudinal slot 16 and with an enlarged collar 17. Such collar is preferably made of two shaped discs 18 and 19 which overlap at their periphery 20. A cap 25 is somewhat conical, having internal threads 26 at one end threaded on the external threads 14 of the probe and engaging the shoulder 13. The cap has a small orifice 27 at its apex. This is concentric with the center of the probe. It is preferable to have the outside surface 28 of the probe somewhat curved as the manner of the point of a bullet. This provides a cavity 29 inside the cap in which may be inserted a jelly-like material with the medicament incorporated therein and after the cap has been filled with the preparation, it is threaded on the end of the probe.

The plunger 30 may be formed of a tube for sake of lightness. It has an inner end 31 with a cylindrical wall 32 and has a rounded nose 33. The cylindrical part fits in and is guided by the guide portion 12 of the probe. A slightly contracted neck 34 when the plunger is pressed inwardly will have a slight clearance in the portion 12. A removable set screw 35 is fitted through the slot 16 and threaded into a threaded opening 36 of the plunger. This limits the plunger in its stroke by the ends of the slot and for operating the plunger there is a handle 37 at the outer end. Thus the handle and the collar afford means for operating the plunger for pressing it inwardly and thereby expel the medicament previously placed in the cavity 29.

It is to be noted that in my invention the only parts of the plunger and of the probe requiring a close sliding fit is the internal cylindrical guide surface 12 of the reduced inner part of the probe 11 in which the cylindrical wall 32 of the inner end 31 of the plunger 30 operates. The reduced contracted neck 34 and the remaining portion of the plunger do not need to have a close fit, in fact at the inturned rim 15 it is not necessary that this have a close sliding fit with the main part of the plunger. Therefore when the cap end 25 is filled with a medicament and attached to the threaded end of the probe, a substantially tight seal so far as the medicament is concerned, is effected by the fit of the end 31 of the probe in the cylinder 12. Further, it is to be noted that the end 31 of the plunger is of less diameter than the portion of the cap adjacent its attachment to the probe. Therefore the medicament is expelled by displacement from the cavity 29. It is to be noted also that the enlarged collar 17 is located between the two opposite ends of the tubular probe 11.

Various changes may be made in the details of the construction without departing from the spirit or scope of the invention as defined by the appended claim.

I claim:

A medicine applicator having a cylindrical probe with an internally contracted portion at its inner end, such portion having a cylindrical internal guide surface, there being external threads at the end of the probe, the outer end of the probe having an inturned rim and a longitudinal slot adjacent thereto, a plunger slidably mounted in the probe having a cylindrical portion with a bearing in the internal guide surface and the rim, a removable set screw extending through the slot and attached to the plunger to limit the stroke thereof, the plunger having a rounded nose on its inner end which when the plunger is retracted extends but slightly beyond the end of the probe, a tapered cap threaded on the end of the probe and having an orifice at its apex, the said cap having a cavity for insertion of a medicament prior to its attachment to the probe, the inward movement of the plunger being adapted to expel the medicament through the orifice, the probe having an enlarged collar spaced from the rim and located in proximity to one end of the slot, the plunger having a handle at its outer end, the said collar and the handle being adapted to be grasped for operating the plunger.

BURNARD A. LEWIS.